No. 879,173. PATENTED FEB. 18, 1908.
L. L. HUGHES & R. G. BROWNING.
FEEDING TROUGH.
APPLICATION FILED MAY 14, 1907.
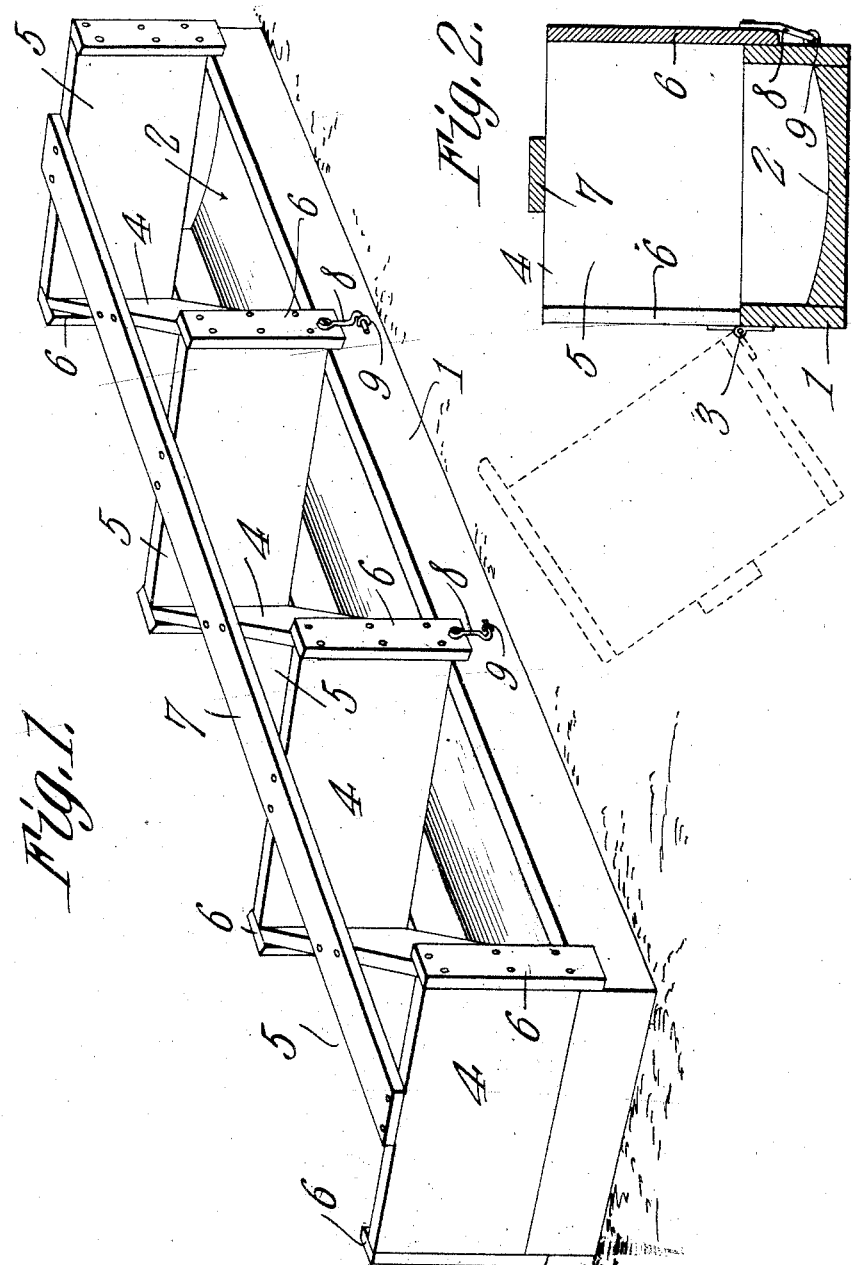
WITNESSES:
Lyman L. Hughes
Robert G. Browning INVENTORS.
By
ATTORNEYS

BEST AVAILABLE COPY

UNITED STATES PATENT OFFICE.

LYMAN L. HUGHES AND ROBERT G. BROWNING, OF MERCER, MISSOURI; SAID BROWNING ASSIGNOR TO SAID HUGHES.

FEEDING-TROUGH.

No. 879,173.  Specification of Letters Patent.  Patented Feb. 18, 1908.

Application filed May 14, 1907. Serial No. 373,542.

*To all whom it may concern:*

Be it known that we, LYMAN L. HUGHES and ROBERT G. BROWNING, citizens of the United States, residing at Mercer, in the county of Mercer and State of Missouri, have invented a new and useful Feeding-Trough, of which the following is a specification.

This invention relates to a feeding trough for animals and is designed to prevent them crowding and interfering with one another, contaminating the food and lying down in the trough.

The main object of the invention is to provide a trough divided into separate compartments or feeding stalls by a zigzag frame above the trough and hinged thereto, which may be thrown back and the trough thoroughly cleaned and food placed therein.

With this object in view the invention further consists of certain novel construction, combination and arrangement of parts hereinafter described and claimed.

In the accompanying drawing: Figure 1 is a perspective view of the trough ready for use. Fig. 2 is a vertical cross sectional view of the same.

Similar numerals of reference are used for the same parts in all the figures.

The numeral 1 indicates the trough proper which may be made of wood or metal, preferably rhomboidal in form and provided with a concaved bottom 2 so that the feed will gravitate towards the center of the trough.

Connected by hinges 3 to one of the longitudinal sides of the trough 1 is a frame, extending from one end of the trough to the other, and of the same shape, formed by joining a plurality of diagonally arranged partitions 4 and their connecting and bracing members. The partitions 4 extend across the trough at such opposed angles that one end of each partition is connected to the adjacent end of the adjoining partition to form a continuous row or series of angular compartments or feeding stalls 5 extending across and opening alternately on opposite sides of the trough as shown. At the exterior apex of each angular compartment 5 is fastened a vertical bracing strip 6 extending downwardly to the trough on the hinged side of the frame and slightly below the top of the trough on the opposite side of said frame.

The hinges 3 are screwed to the strips 6 on one side of the frame and to the trough. Extending the length of the frame is a tie board or rod 7 to which each partition is fastened and by which they are braced and held in fixed position.

A locking device is provided for holding the frame fast on the trough, one form of which is represented in the drawing and consists of hooks 8 attached to any number of bracing strips 6 and staples 9 inserted in the trough on the side opposite that to which the hinges are fastened.

When the trough is to be filled, the hooks 8 are disengaged from the staples 9 and the frame turned on its hinges to the position indicated by dotted lines in Fig. 2. In this position the trough is entirely open and the food can be equally distributed from end to end. The trough may also be cleaned easily when the frame is turned back. After placing the food in the trough the frame is closed over it and fastened and the trough is ready for use.

When swine are fed from a trough constructed as above, the shape of the compartments will prevent more than one animal feeding at the same compartment and will also prevent him from obtaining more food than is contained within the area defined by the partitions, nor can hogs get into the trough and lie down in it because of the small size of the separate compartments.

The board 7 not only serves to tie the partitions together so as to form a rigid frame thereof but also extends over each of the angular compartments so that when the heads of swine are positioned within the compartments this board will be located above them and act as a guard to prevent the swine from climbing or reaching upward over the partitions and interfering with the stock at the other side of the trough.

Having thus described the invention what is claimed is:—

A device of the character described comprising a trough, a frame hingedly connected to one side thereof and consisting of angularly disposed connected partitions arranged in zigzag relation and extending across the trough to form angular compartments arranged alternately at opposite sides of the trough, and a combined brace and guard disposed flat upon and secured to the upper portions of all of the partitions, said brace connecting the partitions and extending over the middle portion of each of the angular compartments.

In testimony that we claim the foregoing as our own, we have hereto affixed our signatures in the presence of two witnesses.

LYMAN L. HUGHES.
ROBERT G. BROWNING.

Witnesses:
W. R. De Hart,
J. H. Somerville.